Patented Sept. 26, 1944

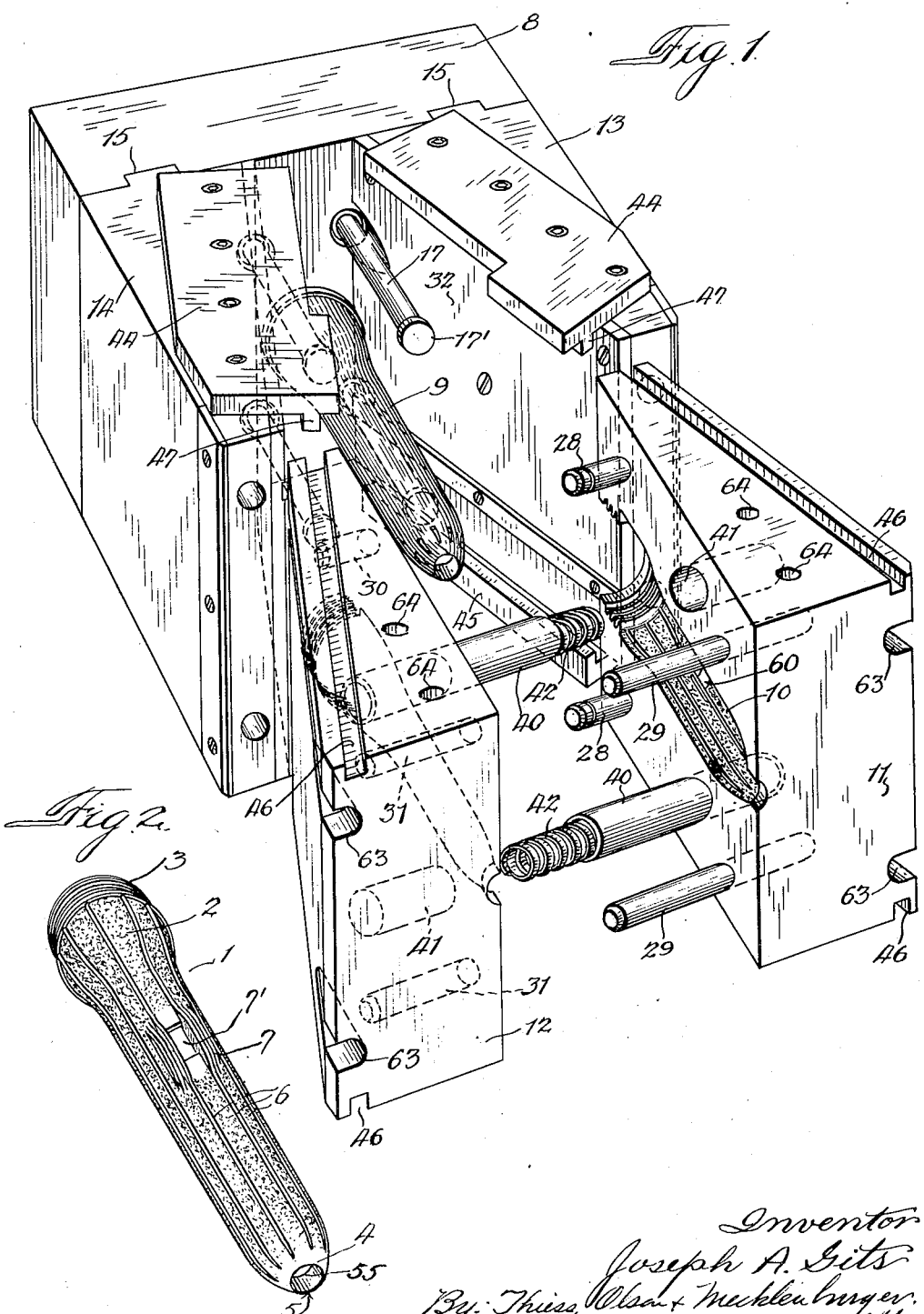

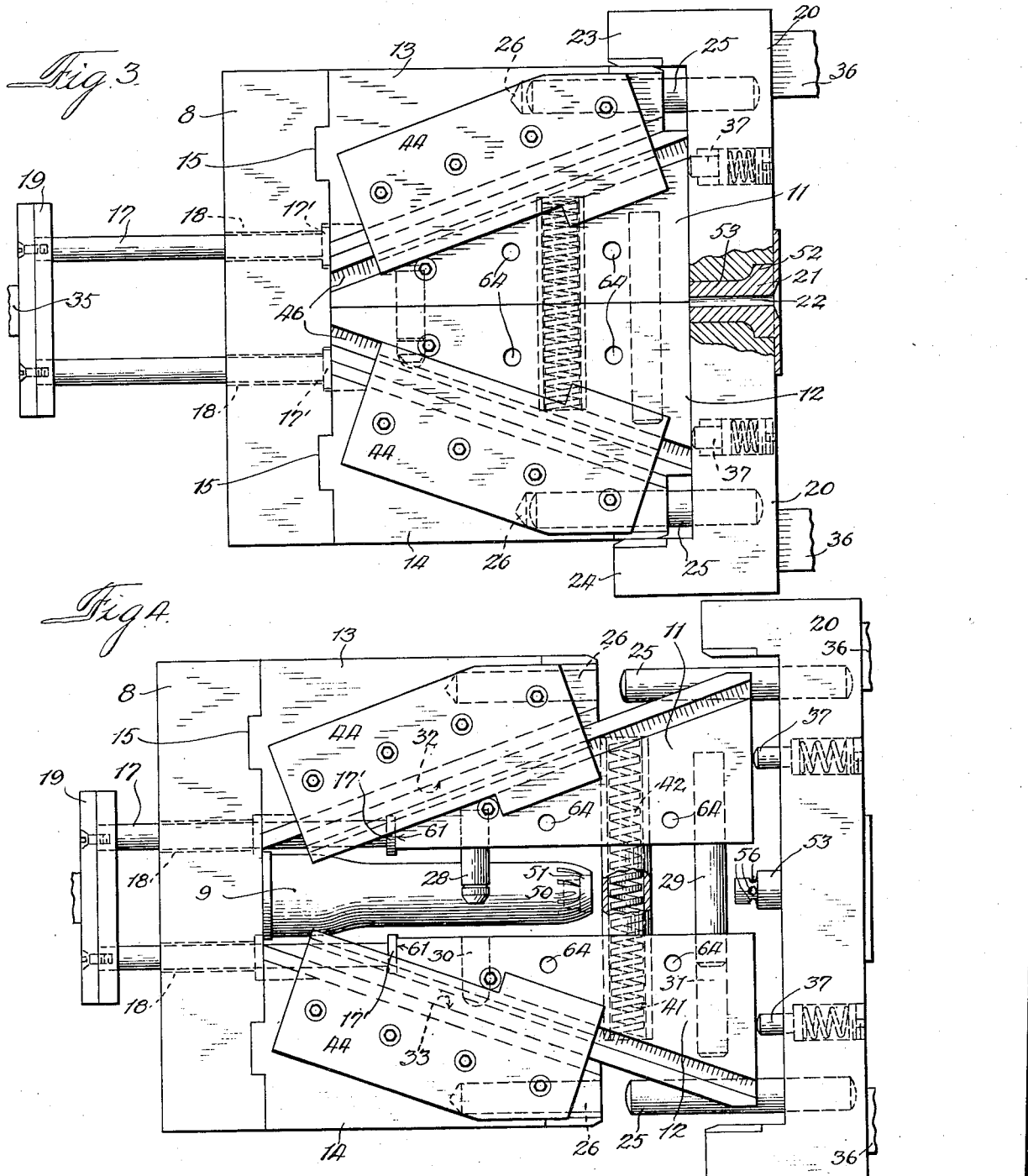

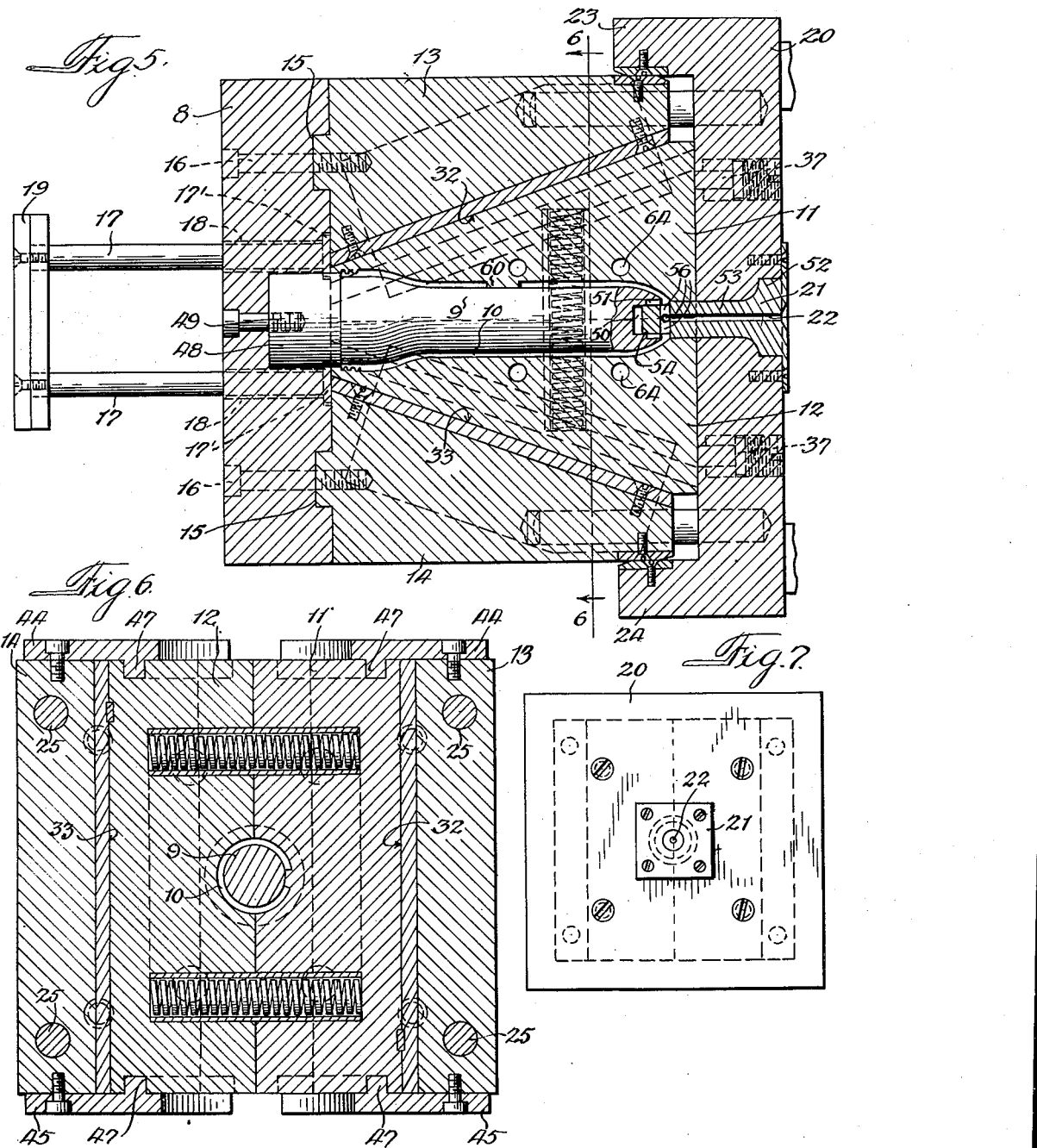

2,358,857

UNITED STATES PATENT OFFICE 2,358,857

DIE FOR MOLDING FLASHLIGHT BODIES

Joseph A. Gits, Chicago, Ill., assignor, by mesne assignments, to himself and Jules P. Gits, Chicago, Ill.

Application August 3, 1940, Serial No. 350,379

13 Claims. (Cl. 18—42)

This invention relates generally to an improvement in injection molding of plastic materials, such as thermoplastic and thermosetting materials, and is directed more specifically to a means for flowing such materials into a mold cavity to control the density of an elongated shell, such as a flashlight barrel, whereby to produce uniform density at any point about and along the shell.

The preferred embodiment of the invention comprises a mold having separable mold sections providing an impression or mold cavity about a core member extending lengthwise thereinto and a sprue connection in flow communication with one end of the cavity, preferably being coaxially disposed with the core, said mold sections being movable parallel to and away from said core initially to free the product to be formed and to move it along the core a predetermined distance so that it will be accessible for endwise removal from the core when these mold sections have been separated sufficiently.

Heretofore, in molding articles of the general character described, such as flashlight barrels, it has been customary to inject the plastic material into the mold cavity at the switch opening, or substantially midway of the barrel. No attempt has been made to control the density. As a result, the material would tend to build up at this point during injection and cause the same to have materially greater density about the switch opening. With greater density at the area of the switch opening, many of the barrels buckled or became so distorted as the result of an uneven strain that even the batteries could not be removed or inserted. Losses resulting from this difficulty were substantial.

One of the principal objects of the invention is to provide a mold or die construction having the parts so related and movable relative to each other that the sprue connection may be located at one end of the mold cavity to feed the plastic material substantially coaxially relative to the core, the density of the walls of the finished product being controlled by causing the material to flow under pressure annularly about the core substantially the entire length thereof, whereby said die parts may thereafter be separated to release the finished product from the core by movement of certain of the die parts along and away from said core and to make the product readily accessible for endwise displacement from the core after the parts are moved to open position.

Another object of the invention is to provide a unique type of mold or die construction capable of producing plastic products of the general character of flashlight barrels by a simple, efficient and economical operation.

A still further object of the invention is to provide certain improvements in mold or die construction capable of producing articles of this character whereby such articles may be rapidly produced in substantial quantities without experiencing the above mentioned loss as the result of uneven annular density of the material throughout the body of the finished product.

Other objects and advantages of the invention will be apparent from the following detailed description when taken in connection with the accompanying drawings, which form a part hereof.

In the drawings:

Figure 1 is a perspective view of the mold or die construction embodying the invention with the parts in open position but with one of the head plates omitted;

Fig. 2 is a perspective view of a molded product of plastic material, such as a flashlight barrel, produced by the mold or die shown in Fig. 1;

Fig. 3 is a top view of the mold or die with the parts shown in closed position;

Fig. 4 is a similar view showing the parts in partly opened position;

Fig. 5 is a horizontal sectional view of the mold or die with the parts shown in closed position;

Fig. 6 is a vertical sectional view taken on line 6—6 of Fig. 5; and

Fig. 7 is an end view at a reduced scale of the movable head plate carrying the sprue connection.

For the purpose of illustration, the invention is shown in conjunction with the molding of a cylindrical shell used for example as a flashlight barrel. It will be apparent, however, that the principle embodied may be applied to the formation of many articles of like character and that from its broadest aspects the invention is not to be limited to any given application. It has, however, a unique and practical use as applied to flashlight barrels to secure a uniform annular density throughout the body thereof.

Fig. 2 illustrates a complete shell or barrel 1 of a flashlight having a front end 2 that is usually threaded at 3 to receive the usual lens and light carrying unit (not shown) and a rear tip 4 that is open at 5 to receive a cap (not shown). The barrel is preferably cylindrical and carries a number of batteries. It may be provided with longitudinal ribs 6 and a series of raised portions 7 on opposite sides of an opening 7' through which a manually operable member connects to a circuit making and breaking member, the latter parts not being shown.

Shell or barrel 1 is molded of plastic material. The die or mold for producing this barrel 1 comprises a head plate 8 carrying a core 9 which extends into a mold cavity 10 formed by two wedge-shaped die members 11 and 12 slidably movable along die blocks 13 and 14 anchored to said head plate 8 as by tongue and slot connections 15 on opposite sides, as shown in Fig. 5, and by bolts 16. Knockout pins 17 are adapted to lie in openings 18 provided in head plate 8 so that, through a knockout plate 19 carried at their outer ends, heads 17' at the inner ends of pins 17 may be forced inwardly to engage and move die members 11 and 12 whereby to spread the same outwardly and away from each other along the tapered sides 32 and 33 of die blocks 13 and 14. The action of die members 11 and 12 will be more fully explained later.

A front or movable head plate 20 is adapted to carry a sprue connection 21 and the usual gate 22, which communicates with mold cavity 10. Head plate 20 may be of U-formation with its side arms 23 and 24 embracing the sides of die blocks 13 and 14 when it is in closed position. A plurality of guide pins 25 may be provided in the body of head plate 20 adjacent ends 23 and 24 to cooperate with openings 26 in the end faces of die blocks 13 and 14 so as to guide and rigidly hold head plate 20 in closed position during injection of the plastic material, which is usually under relatively high pressure. Such pressures are generally in the neighborhood of 20 to 30 tons per square inch. In the present case, I propose to maintain this pressure upon the plastic material until cavity 10 is filled. Similar guide pins 28 and 29 and openings 30 and 31 are provided between die members 11 and 12. These pins may be carried in either die member. As shown, they are mounted in die member 11 while openings 30 and 31 are provided in die member 12. Pins 29 are preferably longer so that they will guide and hold the die members together at their outer ends for a longer period in their movement. The inner ends of these die members are held against the tapered faces 32 and 33 and are guided thereby during this period, and therefore, preferably require the engagement of pins 28 in openings 30 only near the end of the closing movement as well as during the injection operation to keep these parts tightly together.

Operating means schematically illustrated at 35 and 36 in Fig. 3 form the mechanism that may be used for actuating both the knockout plate 19 and movable head plate 20. Means 36 force head plate 20 inwardly to closed position against the action of spring pressed plungers 37 which engage the outer faces of die members 11 and 12 and press the same inwardly along tapered faces 32 and 33 of die blocks 13 and 14. Spring pressed plungers 37 act as cushioning elements between head plate 20 and these die members during the closing action. One or more sleeves 40 may be mounted to project a predetermined distance from the inner face of each die member. Corresponding openings 41 are provided in the opposite die member to receive the free ends of these sleeves and also springs 42 disposed in said sleeves. Springs 42 tend to urge die members 11 and 12 apart when they are moved outwardly to open position. Consequently, these springs 42 will be compressed when die members 11 and 12 are moved inwardly. If so desired, sleeves 40 may project a distance from die members 11 and 12 to extend the entire length of openings 41 when the die members are closed. Die members 11 and 12 are held perpendicularly by and ride along upper and lower track plates 44 and 45 bolted to the upper and lower faces of die blocks 13 and 14. Grooves 46 are provided in the upper and lower faces of die members 11 and 12 to receive flanges 47 on plates 44 and 45. Thus, die members 11 and 12 are held against the tapered faces 32 and 33 of die blocks 13 and 14 as they are actuated.

When die members 11 and 12 are moved completely closed as shown in Figs. 3 and 5, they enclose core 9. The adjacent surfaces of die members 11 and 12 about core 9 correspond to the outer surface of the finished product while the surface of core 9 corresponds to the inner surface of the finished product. Core 9 may be supported at one end. As shown in the drawings, the end adjacent head plate 8 is provided with a head 48 seated in this head plate 8 and bolted thereto at 49. The opposite end of core 9 is provided with a stepped recess, the reduced portion 50 extending inwardly beyond portion 51. Sprue connection 21 is seated in head plate 20. It is provided with a head 52 and a shank 53 that projects beyond the inside face of head plate 20 a distance preferably equal to the thickness of the wall of die members 11 and 12 lying between the adjacent end of cavity 10 and the outer faces of these die members. Shank 53 is then reduced at its tip 54 so that this tip 54 is preferably of a diameter adapting it snugly to fit within reduced recess 50 in core 9, as shown in Fig. 5. Hence, recess 51 lies about sprue tip 54 to constitute, in effect, an extension of cavity 10 and form, in the molding, an inwardly extending annular wall 55 at opening 5 in the rear end 4 of the finished flashlight barrel 1 (see Fig. 2). Gate 22 continues forwardly through shank 53 and connects with a plurality of radial openings 56 having flow communication with cavity 10. It will be apparent that the sprue connection is coaxially positioned with respect to core 9 and also with respect to cavity 10 so that the material may be fed in a plastic state into cavity 10 at this end annularly about the core and uniformly forced under high pressure in an annular stream forwardly about and along the core the entire distance of cavity 10, so that the annular density of the material at any point will be substantially uniform.

The novel construction of the die parts, as thus described, allows the provision of certain structural formations exteriorly of flashlight barrel 1, such as threads 3 at front end 2 and switch opening 7' without interfering with the injection operation or the opening and closing movements of these die parts. Switch opening 7' is formed by a projection 60 on die member 11, this projection extending into cavity 10. The shoulders on the inner surface of die members 11 and 12 forming threads 3 on the finished product, together with projection 60, function to move the finished product axially along core 9 upon the initial spreading action of die members 11 and 12 after an injection operation. Heads 17' of knockout pins 17 engage end faces 61 on die members 11 and 12, and as these pins are moved inwardly by means 35 engaging knockout plate 19, die members move outwardly, first moving for a short distance parallel to and along the core with little if any spreading, due to the taper of the walls 32 and 33 of die blocks 13 and 14, and then spreading rather rapidly after the thread forming shoulders on the wall of cavity 10 and projection 60 move sufficiently outward to free themselves from the correspondingly formed surfaces on the finished barrel.

Openings 63 in the sides of die members 11 and 12 cause the latter to be guided upon pins 25 carried by movable head plate 20 as it is simultaneously moved with these die members away from this end of the die. Thus, the die members 11 and 12 are held in their proper relative position with respect to the other parts when the die is opened to remove a finished article. Guide plates 44 also serve this function.

From the foregoing description, it will be apparent that an apparatus and a method are described for molding an elongated plastic product having a uniform annular density which provides a stronger product less apt to crack or break in handling or use. The wall of this elongated plastic shell may be of different thicknesses, this being controlled by the depth of the mold cavity and its shape. The plastic material is flowed uniformly forward from one end in a concentric stream and at the same constant pressure so that the material will not build up at any point and cause variations in density. The die construction novelly permits the molding of such a product in a simple manner and allows its parts to be easily and quickly moved to open and closed position, first to remove a finished article and then to be again closed for another operation, without delay in their handling or in the removal of a finished article from the free end of the core. The molding is preferably by the injection method under relatively high pressure.

It is found desirable to circulate a cooling fluid through openings 64 in the members 11 and 12 when they are in closed position after an injection of plastic material into cavity 10 and before the die parts are again opened. The cooling fluid is preferably of lower temperature than the plastic material at the time it enters cavity 10 so as to effect an immediate chilling and setting of the plastic material, it being noted that this cooling action greatly facilitates forcing the material into cavity 10, throughout its length, uniformly in an annular stream without permitting it to build up at any point.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. A die construction of the type described comprising two die blocks stationary relative to each other, a head plate to which said die blocks are secured at one end in spaced relation to each other, a second head plate adapted to be movably positioned against the opposite end of said die blocks, a core member carried by said first head plate, said core member projecting into the space between said die blocks, a sprue carried by said movable head plate and a pair of die members disposed between said die blocks and adapted to surround said core member said die blocks being constructed and arranged to force said die members together when moved to closed position, said die members adapted to move longitudinally along and away from said core in the direction of said movable head member when said movable head member is moved to an open position away from the opposite end of said die blocks.

2. A die construction of the type described comprising two relatively immovable die blocks, a head plate to which said die blocks are secured at one end in spaced relation to each other, a second head plate adapted to be movably mounted against the opposite end of said die blocks, a pair of die members in the space between said die blocks, and a cylindrical core member carried by said first head plate, said core member projecting centrally between said die members to form with adjacent surfaces of said die members an impression or mold cavity extending lengthwise of said cylindrical core member, a sprue carried by said movable head plate, said die blocks being constructed and arranged to force said die members together when moved to closed position, said die members being initially movable with respect to said cylindrical core member to free the article to be produced and to move it along said core member when said head member is opened, said die members being arranged to continue their movement longitudinally of but also away from said core member in the direction of said head member until said die members have moved a distance making the article accessible for removal endwise of said core member.

3. Molding apparatus for molding by injection a cylindrically formed shell of plastic material with a uniform annular density comprising a pair of relatively fixed die blocks, head plates at opposite ends, one of said plates being stationary with respect to one end of said die blocks and the other plate being movable with respect to the other end of said die blocks, separable die members between said die blocks said die blocks being constructed and arranged to force said die members together when moved to closed position, the adjacent surfaces of said die members forming an impression or mold cavity, a cylindrical core projecting between said die members to lie lengthwise in said mold cavity, a sprue connection on said movable head plate in flow communication with one end of said mold cavity to inject the plastic material from said end whereby uniformly to flow the plastic material annularly forward about and along said core, and means operable after each injection to move said movable head plate to open position and thereby to withdraw said sprue, said means also moving said die members longitudinally of and away from said core to separate the said die members and to free and project the product a distance at the free end of said core to be accessible as said movable head plate is moved to open position.

4. Molding apparatus for molding by injection a cylindrically formed shell of plastic material comprising a pair of relatively fixed die blocks, head plates at opposite ends, one of said head plates being stationary with respect to one end of said die blocks and the other head plate being movable with respect to the other end of said die blocks, said movable head plate carrying a sprue connection for feeding the plastic material to an impression or mold cavity between said die blocks when said movable plate is closed, a pair of separable die members movable to closed position by and between said die blocks, the adjacent surfaces of said die members forming said impression or mold cavity, a cylindrical core projecting from said stationary head plate between said die members to lie lengthwise in said mold cavity, said sprue connection being at one end of said cavity and coaxially disposed with respect to said core to inject the plastic material from said end and uniformly to flow the plastic material annularly forward about and along said core, and means operable after each injection to move said movable head plate to open position and to withdraw said sprue, said means moving said die members longitudinally of and away from said core to separate said die members and to free and project the product to be formed a predetermined distance at the free end of said core as said movable head plate is moved to open position.

5. Molding apparatus for molding by injection a cylindrically formed shell of plastic material comprising a head plate, a pair of relatively immovable die blocks secured to said head plate, a pair of die members between said die blocks, said die blocks being constructed and arranged to force said die members together when moved to closed position, a cylindrical core member extending from said head plate between said die members and forming an impression or mold chamber with adjacent surfaces of said die members, means for feeding the plastic material under pressure along said core member from one end thereof, means for holding the temperature of said die members at a lower temperature than the temperature of the plastic material while said feeding means is injecting the plastic material into said mold chamber, and means for separating said die members upon completion of said injection operation by moving the same along and away from said core member, the initial movement of said die members freeing the article to be produced from said core member and moving it along the same a distance to be accessible for removal at the open end of said die members.

6. Molding apparatus for molding by injection a cylindrically formed shell of plastic material with a uniform annular density comprising a pair of relatively immovable die blocks, head plates at opposite ends, one of said plates being stationary with respect to one end of said die blocks and the other plate being movable with respect to the other end of said die blocks, separable die members between said die blocks, said die blocks being constructed and arranged to force said die members together when moved to closed position, the adjacent surfaces of said die members forming an impression or mold cavity, a cylindrical core projecting between said die members to lie lengthwise in said mold cavity, and means for feeding the plastic material into said mold cavity at one end uniformly to flow the same annularly forward about and along said core.

7. Molding apparatus for molding by injection a cylindrically formed shell of plastic material with a uniform annular density comprising relatively immovable die blocks and a head end, a pair of separable die members with an impression or mold cavity formed between adjacent surfaces of said die members said die blocks being constructed and arranged to force said die members together when moved to closed position, a cylindrical core projecting between said die members to lie lengthwise in said mold cavity, a sprue connection in flow communication with one end of said mold cavity to inject the plastic material from said end and uniformly to flow the plastic material annularly forward about and along said core, and means to separate said die members, said means moving said die members initially to free and move the product to be produced along said core in the direction of its free end so as to be removably accessible and thereafter to continue moving said die members along and away from said core member sufficiently to allow the product to be slipped endwise from said core.

8. Apparatus for molding by injection under relatively high pressure comprising a die having its parts held mechanically interlocked in closed position by a single movable end plate comprising two die members and a core member projecting between said die members to form with adjacent surfaces of said die members an impression or mold cavity, two die blocks and an immovable end plate, said die blocks and said end plate being immovable with respect to each other, the inner surfaces of said die blocks being tapered outwardly in a direction away from said immovable end plate, said die members having their outer surfaces tapered to conform to the taper of said inner surfaces of said die blocks and to move therealong when they are actuated either to open or to closed positions, means between said die blocks and said die members to lock said die members against movement except said movement to open or to close said die members, there being means to provide a sprue connection to feed plastic material to said cavity, and a movable end plate opposing said immovable end plate for locking said die members in closed position between said die blocks, said die members being movable along their tapered surfaces and the tapered surfaces of said die blocks whereby, when moved to open position by the opening of said movable end plate, said die members will move both longitudinally along and away from said core member.

9. Apparatus for molding by injection at relatively high pressure comprising immovable die blocks and an immovable head member at one end of said die blocks, die members movable to closed position between said die blocks, a core member projecting between said die members to form with adjacent surfaces of said die members an impression or mold cavity, said die members having a surface engagement with said die blocks and positioned to move into and out of said die blocks, in a direction longitudinally of said die blocks, the cooperating surfaces of said die blocks and said die members being tapered outwardly in the direction of said movement of said die members, means to interlock said die blocks and said die members against relative movement except said movement in a direction longitudinally of said die blocks, there being means to provide a sprue connection to feed plastic material to said cavity, and a movable end plate embracingly holding said die members, when in closed position, between said die blocks.

10. Apparatus for molding by injection at relatively high pressure comprising immovable die blocks and a head member at one end of said die blocks, die members movable to closed position between said die blocks, a core member projecting between said die members to form with adjacent surfaces of said die members an impression or mold cavity, said die members having a surface engagement with said die blocks and positioned to move into and out of said die blocks in a direction longitudinally along said core member, the cooperating surfaces of said die blocks and said die members being tapered outwardly in the direction of movement of said die members and away from the end of said head member, means to interlock said die members and said die blocks against relative movement except in a direction longitudinally of said core member, there being means to provide a sprue connection to feed plastic material to said cavity, and a movable end plate opposing said head member and holding said die members, when in closed position, between said die blocks.

11. Molding apparatus for molding by injection an elongated object comprising spaced die blocks, die members movable to lie against the inside faces of said die blocks when said die members are in a closed position, the cooperating faces of said die members and said inside faces of said die blocks being tapered outwardly in the direction of movement of said die members when moved to open position, an elongated core projecting between said die members to form with adjacent surfaces of said die members an impression or mold cavity, and two head members, one of which is movable away from said die blocks and said die members, said core being carried at one of its ends by one of said head members, there being means to provide a sprue connection to feed plastic material to said cavity, and a projection on the other head member for receiving the free end of said core to hold said core against flexing movement during the injection of the molding material into said impression or mold cavity.

12. Molding apparatus for molding plastic objects under relatively high pressures comprising spaced die blocks, die members movable to closed position within said die blocks, tapered surfaces between said die blocks and said die members, the taper of said surfaces being outwardly in the direction of movement of said die members when moving to open position, interlocking track means between said die block and said die members for preventing relative movement of said parts excepting in the direction of movement of said die members either to open or closed positions, an impression or mold cavity between said die members, there being means to provide a sprue connection to feed plastic material to said cavity, and opposing head members at opposite ends of said die blocks, one of said head members being movable and embracing one end of said die blocks for interlockingly holding said die members together and within said die blocks when said die members are in closed position.

13. Molding apparatus for molding plastic objects by injection under relatively high pressures comprising a relatively fixed die block structure including a fixed end head member, die members having an impression or mold cavity movable to lie against the inside faces of said die block structure when said die members are in closed position, the cooperating faces of said die members and said inside faces of said die block structure being tapered outwardly in the direction of movement of said die members when moved to open position, interlocking means between said die block structure and said die members for preventing relative movement between said die block structure and said die members except in the direction of movement of said die members either to open or closed positions, there being means to provide a sprue connection to feed plastic material to said cavity, and a movable head member at the end of said die block structure opposite to said fixed end head member for interlockingly holding said die members together in closed position in said die block structure.

JOSEPH A. GITS.